United States Patent [19]

Kadohara et al.

[11] Patent Number: 5,081,479

[45] Date of Patent: Jan. 14, 1992

[54] AUTOMATIC FOCUSING DEVICE

[75] Inventors: Terutake Kadohara; Akira Akashi; Masaki Higashihara, all of Yokohama; Ichiro Ohnuki, Kawasaki, all of Japan

[73] Assignee: Canon Kabushiki Kaisha, Tokyo, Japan

[21] Appl. No.: 467,196

[22] Filed: Jan. 18, 1990

[30] Foreign Application Priority Data

Jan. 19, 1989 [JP] Japan .................................. 1-010777

[51] Int. Cl.⁵ .............................................. G03B 13/36
[52] U.S. Cl. .................................................... 354/402
[58] Field of Search .............. 354/400, 402, 403, 406, 354/407, 408

[56] References Cited

U.S. PATENT DOCUMENTS

| | | | |
|---|---|---|---|
| 4,855,776 | 8/1989 | Akashi | 354/402 |
| 4,908,645 | 3/1990 | Higashihara et al. | 354/402 |
| 4,924,250 | 5/1990 | Hamada et al. | 354/402 |
| 4,967,224 | 10/1990 | Hamada et al. | 354/402 |
| 4,972,221 | 11/1990 | Ohnuki et al. | 354/402 |
| 5,005,037 | 4/1991 | Akashi et al. | 354/400 |
| 5,012,267 | 4/1991 | Higashihara | 354/402 |

*Primary Examiner*—W. B. Perkey
*Attorney, Agent, or Firm*—Fitzpatrick, Cella, Harper & Scinto

[57] ABSTRACT

This invention relates to an automatic focusing device, particular capable of foreseeing the position of an object after a predetermined future time based on the results of a plurality of past focusing operations, thus enabling the focusing to the object. An automatic focusing device is provided which executes calculations for the above-mentioned foreseeing after the execution of a predetermined number of focusing operations. However, if a focused state is identified in a focusing operation in the course of the execution of the predetermined number of focusing operations, the device is adapted to disregard the first-mentioned focusing operation as if it had not been conducted and to exclude the first-mentioned focusing operation from the counting of the predetermined number of focusing operations.

25 Claims, 10 Drawing Sheets

AUTOMATIC FOCUSING DEVICE

BACKGROUND OF THE INVENTION

1. Field of the Invention

The present invention relates to an automatic focusing device adapted for use in a camera or the like.

2. Related Background Art

Most of the automatic focusing methods conventionally employed in the single-lens reflex cameras achieve focusing to an object by repeating a cycle of focus state detection (signal input from a sensor and calculation of focus state) and lens drive. The amount of lens movement in each cycle is based on the amount of defocus determined by the focus state detection in said cycle, and it is anticipated that the amount of defocus is brought to zero at the end of the lens drive.

The focus state detection and the lens movement naturally require a certain amount of time. However, in the case of a stationary object, the amount of defocus does not change unless the lens is moved, so that the amount of defocus to be cancelled at the end of lens movement is equal to the amount of defocus detected at the focus state detection, and correct focusing can therefore be achieved.

On the other hand, for a fast moving object, the amount of defocus varies in the course of focus state detection and lens movement, so that the amount of defocus to be cancelled may be significantly different from the detected amount of defocus. As a result, the focusing to the object may not be achieved at the end of lens movement.

Automatic focusing devices for avoiding such a drawback have been proposed in the Japanese Laid-Open Patents Sho 62-125311, Sho 62-139512, Sho 62-139511 and Sho 62-269936.

The automatic focusing devices disclosed in the above-mentioned patents are, in summary, to correct the amount of lens movement by foreseeing the change of the amount of defocus resulting from the movement of the object, in consideration of the change in the amount of defocus detected in said cycles and of the interval of said cycles, and are expected to improve the accuracy of focusing at the end of lens movement.

However, such an automatic focusing method involving correction may result in the following drawback when the object is stopped.

Even when the object is stopped, the result of focus state detection by detecting means is not constant but shows a certain fluctuation due, for example, to the influence of noises in said detecting means, and such fluctuating results may be misunderstood to indicate that the object is moving. Thus, the correction in such an automatic focusing method may lead to an improper focusing.

FIG. 9 is a chart showing the conventional method of correcting the amount of lens movement, indicating the position d of the image plane of the object in the ordinate, as a function of time in the abscissa.

A solid line f(t) indicates the image plane position of the object, while a broken line l(t) indicates the image plane position of the lens.

More detailedly, the line f(t) indicates the position, at time t, of the image plane of an object axially approaching to the camera when the focusing optical system of the photographing lens is focused at an infinite object distance, while the line l(t) indicates the position of the image plane of said object at the focusing state at time t of the focusing optical system. Each section $[t_i, t_i']$ indicates a focus state detecting operation, and each section $[t_i', t_{i+1}]$ indicates a lens driving operation.

Consequently, a so-called defocus amount is represented by the difference between f(t) and l(t) at the same time t, along the ordinate d. DFi is the defocus amount detected at a time $t_i$; DLi is the amount of lens movement determined from the focus state detection at a time $t_{i-1}$ and represented by the change in the image plane position; and TMi is the interval in time of the focusing operations.

The conventional example shown in FIG. 9 is based on an assumption, for the corrective calculation, that the image plane position of the object varies according to a second-order function. More specifically, it is assumed, at a time $t_3$, that the image plane position at a time $t_4$ is foreseeable if three image plane positions ($t_1$, $f_1$), ($t_2$, $f_2$) and ($t_3$, $f_3$) at past and present are known.

In practice, however, the camera cannot detect the image plane positions $f_1$, $f_2$, $f_3$ but the defocus amounts DF1, DF2, DF3 and the lens drive amounts DL1, DL2 represented in the amount of image plane movement. The future time $t_4$ is unfixed and varies according to the change in the accumulating time of the charge accumulating sensor by the luminance of the object, but, for the purpose of simplicity in determining $f_4$, $t_4$ is defined as being known from $t_4 - t_3 = t_3 - t_2$.

Under the assumptions explained above, the lens drive amount in the section from $t_3'$ to $t_4$, based on the result of the focus state detection at $t_3$, is calculated according to the following relations:

$$a \cdot t^2 + b \cdot t + c = f(t) \quad (1)$$

$$a \cdot t_1^2 + b \cdot t_1 + c = f(t_1) \quad (2)$$

$$a \cdot t_2^2 + b \cdot t_2 + c = f(t_2) \quad (2')$$

$$a \cdot t_3^2 + b \cdot t_3 + c = f(t_3) \quad (2'')$$

Taking the point $l_1$ in FIG. 9 as the original point;

$$f_1 = DF1 \quad (3)$$

$$f_2 = DF2 + DL1 \quad (3')$$

$$f_3 = DF3 + DL2 + DL1 \quad (3'')$$

$$t_1 = 0 \quad (4)$$

$$t_2 = TM1 \quad (4')$$

$$t_3 = TM1 + TM2 \quad (4'')$$

The coefficients a, b and c are determined by substituting the equations (3), (3'), (3''), (4), (4'), and (4'') into the equations (2), (2') and (2''):

$$a = \frac{DF3 + DL2 - DF2}{(TM1 + TM2) \cdot TM2} + \frac{DF1 - DL1 - DF2}{(TM1 + TM2) \cdot TM1} \quad (5)$$

$$b = \frac{DF2 + DL1 - DF1}{TM1} - a \cdot TM1 \quad (6)$$

$$C = DF1 \quad (7)$$

Consequently the lens drive amount represented in the amount of image plane movement DL3 at time $t_4$ is given by:

$$DL3 = f_4 - l_3 \quad (8)$$
$$= f_4 - (f_3 - DF3)$$
$$= a(TM1 + TM2 + TM3)^2 +$$
$$b(TM1 + TM2 + TM3) +$$
$$c - \{a(TM1 + TM2)^2 -$$
$$b(TM1 + TM2) + c\} + DF3$$
$$= a\{(TM1 + TM2 + TM3)^2 -$$
$$(TM1 + TM2)^2\} + bTM3 + DF3$$

Thus DL3 is determined from the equation (8) on the aforementioned assumption that TM3=TM2.

Thereafter the lens drive amount at a time $t_i$ can be obtained in a similar manner, as indicated below, from the defocus amounts DFi-2, DFi-1, DFi in three past detections, the lens drive amounts DL1-2, DL1-1 in two past lens drives, and the two past time intervals TMi-2, TMi-1:

$$a_i = \frac{(DFi - DLi\text{-}1 - DFi\text{-}1)}{(TMi\text{-}2 + TMi\text{-}1)TMi\text{-}1} + \quad (9)$$
$$\frac{(DFi\text{-}2 - DLi\text{-}2 - DFi\text{-}1)}{(TMi\text{-}2 + TMi\text{-}1)TMi\text{-}2}$$

$$b_i = \frac{DFi\text{-}1 + DLi\text{-}2 - DFi\text{-}2}{TMi\text{-}2} - a \cdot TMi\text{-}2 \quad (10)$$

$$DLi = a_i\{(TMi\text{-}2 + TMi\text{-}1 + TMi)^2 - \quad (11)$$
$$(TMi\text{-}2 + TMi\text{-}1)^2\} + b_i \cdot TMi + DFi$$

Thus a proper focusing is obtained at the end of the lens driving operation even for a moving object, by determining the defocus amount DLi for the lens movement from the detected defocus DFi according to the equations (9), (10) and (11).

In the correcting method explained above, there are required data of at least two focusing operations in the past, in order to extrapolate the image plane position by a second-order function. However in the first two cycles of focusing, in which such data are not yet available, the lens is driven based on the detected defocus itself as shown in FIG. 9. In these cycles the correction is not applied by the correction means explained above. The actual corrective calculation is started from the third lens driving operation, and the effect of correction appears from the time $t_4$, as shown in FIG. 9.

FIG. 10 shows a case of a stopped object, in which the lens is driven with a correction erroneously determined by misunderstanding the noises as a movement of the object. As in FIG. 9, the abscissa indicates time t, while the ordinate indicates the image plane position d of the object. However, a unit in the ordinate of FIG. 9 is in a magnified scale. A solid line f(t) indicates the image plane position of the object, while a folded line l(t) indicates the image plane position of the lens. Broken lines indicate the depth of focus of the optical system, by a value F $\delta/2$ on either side of the detected focus position, wherein F is the fully open F-number of the lens and $\delta$ is the size of a minimum aberration circle. Stated differently, photographing in a focused state is possible if the folded line l(t) is positioned inside an area defined by the broken lines.

In FIG. 10, the correction by the correction means is not applied from the cycle $f_1$ to the defocus detection in $f_3$. In the illustrated example, the lens is not driven in the cycle $f_1$ since the defocus detected at $(t_1, f_1)$ is within the depth of focus. However, the lens is driven at the next cycle because the defocus detected at $(t_2, f_2)$ exceeds the depth of focus for some reason such as noise. At the next lens drive in response to the detection at $(t_3, f_3)$, the abovementioned correction is added to obtain a result $l_4$. However, even if the detection $(t_4, f_4)$ provides a substantially correct result for the stopped object, a correction is added to the next lens drive to reach a result $l_5$ by a misunderstanding that the object has moved. Consequently, said corrections bring the lens into defocus states at $l_4$ and $l_5$.

SUMMARY OF THE INVENTION

An aspect of the present invention is to provide an automatic focusing device for effecting a corrective calculation for determining the lens drive amount for focusing to the object after a predetermined time, based on the data of past plural focusing operations, which is capable of disregarding a focusing operation if a focused state is identified in said operation in the course of plural focusing operations for obtaining said data of past plural focusing operations.

Another aspect of the present invention is to provide, under the above-mentioned object, an automatic focusing device which, in the course of focusing operations of N times for obtaining said data, if a focused state is identified in the M-th focusing operation (M≦N), regards the next focusing operation as the M-th operation, and thereafter continues the focusing operations.

Still another aspect of the present invention is to provide, under the above-mentioned objects, an automatic focusing device capable of cancelling the M-th focusing operation identified as a focused state and utilizing the data of a next focusing operation regarded as M-th operation, as the m-th data.

Still another aspect of the present invention is to provide, under the above-mentioned objects, an automatic focusing device which, in the course of said focusing operation and after the identification of the focused state, increases the range of identification of the focused state in the succeeding focusing operations.

Still other objects of the present invention will become fully apparent from the following description of embodiments which is to be taken in conjunction with the attached drawings.

DESCRIPTION OF THE PREFERRED EMBODIMENTS

At first the working principle of an embodiment of the present invention will be explained with reference to FIG. 8, and in comparison with FIG. 10.

Figure 8:
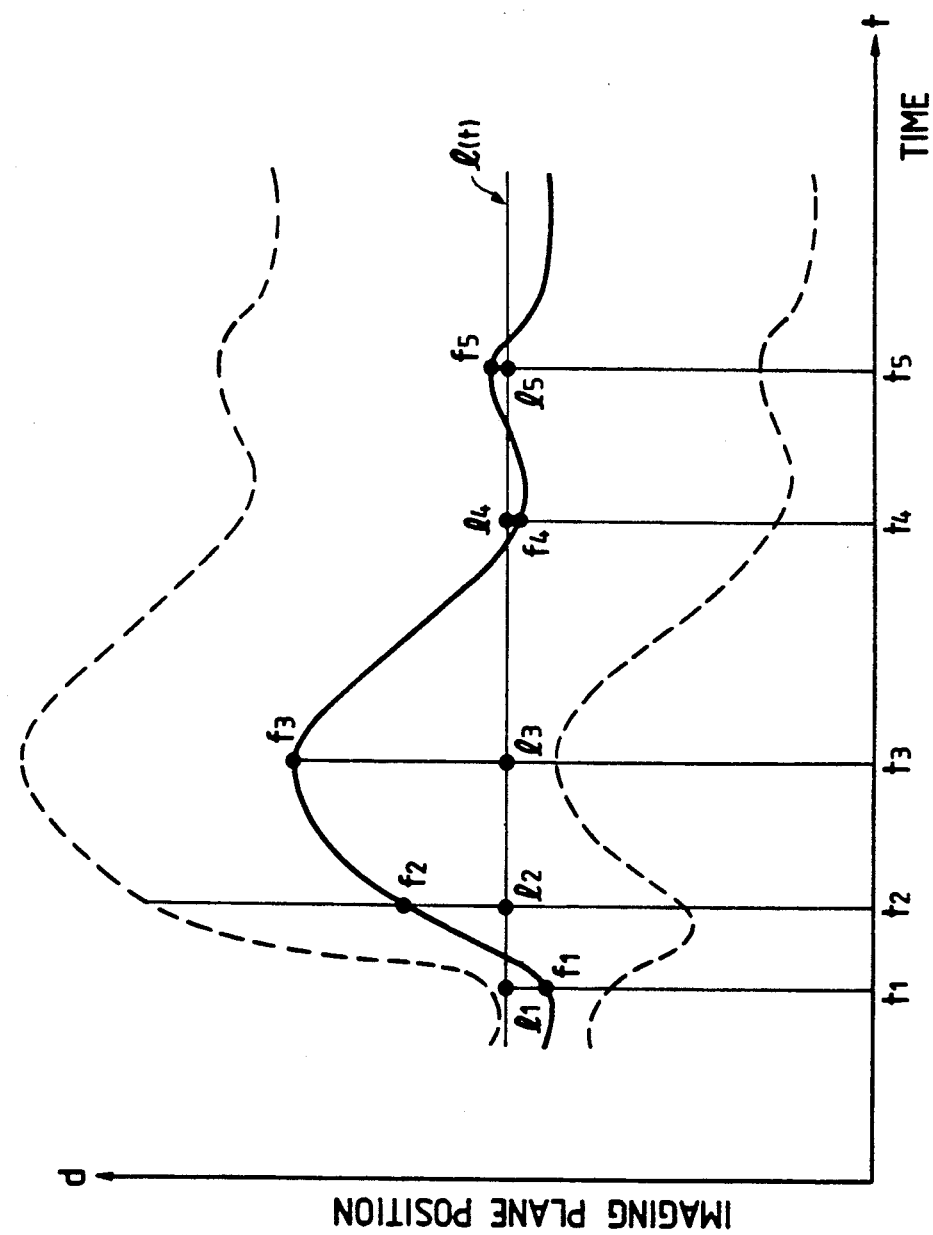
FIG. 8 is a chart showing the working principle of embodiments of the present invention.
Figure 9:
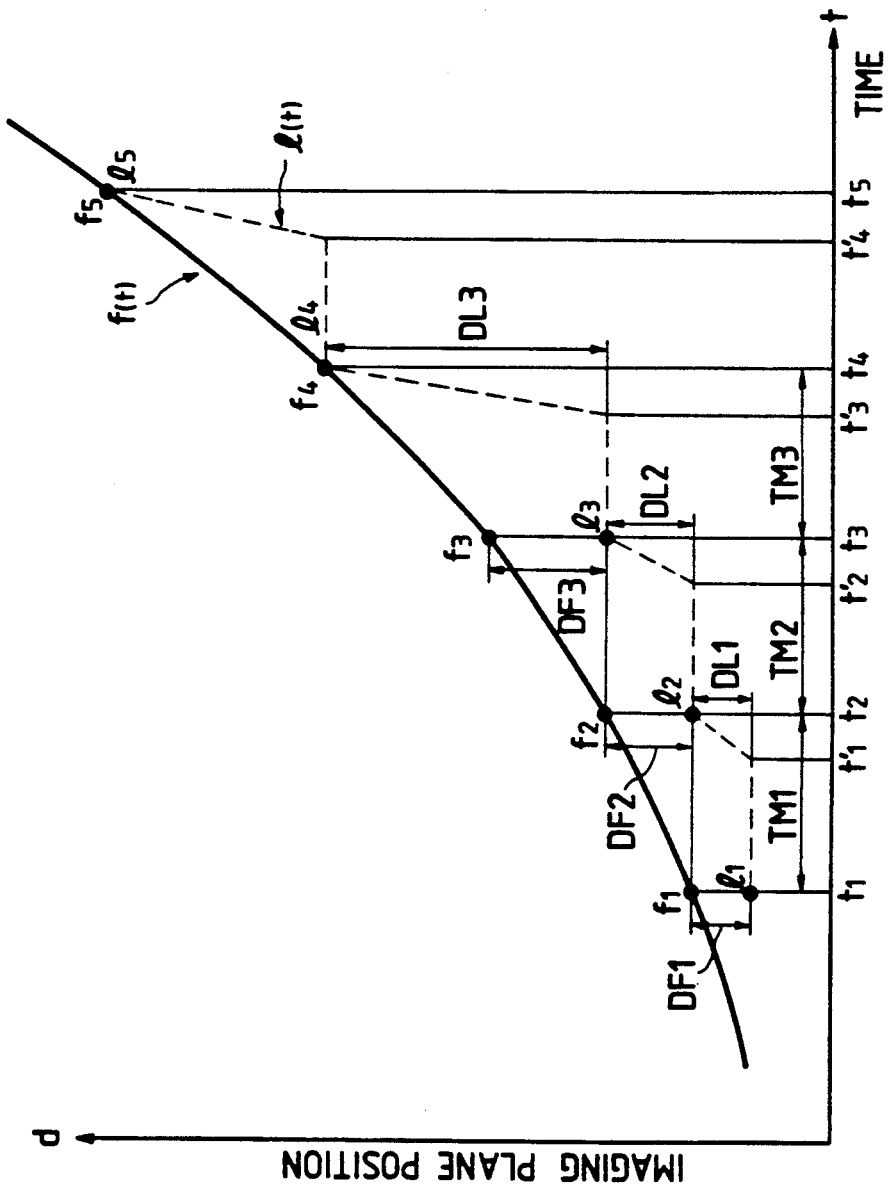
FIG. 9 is a chart showing the focusing operation in a conventional device.
Figure 10:
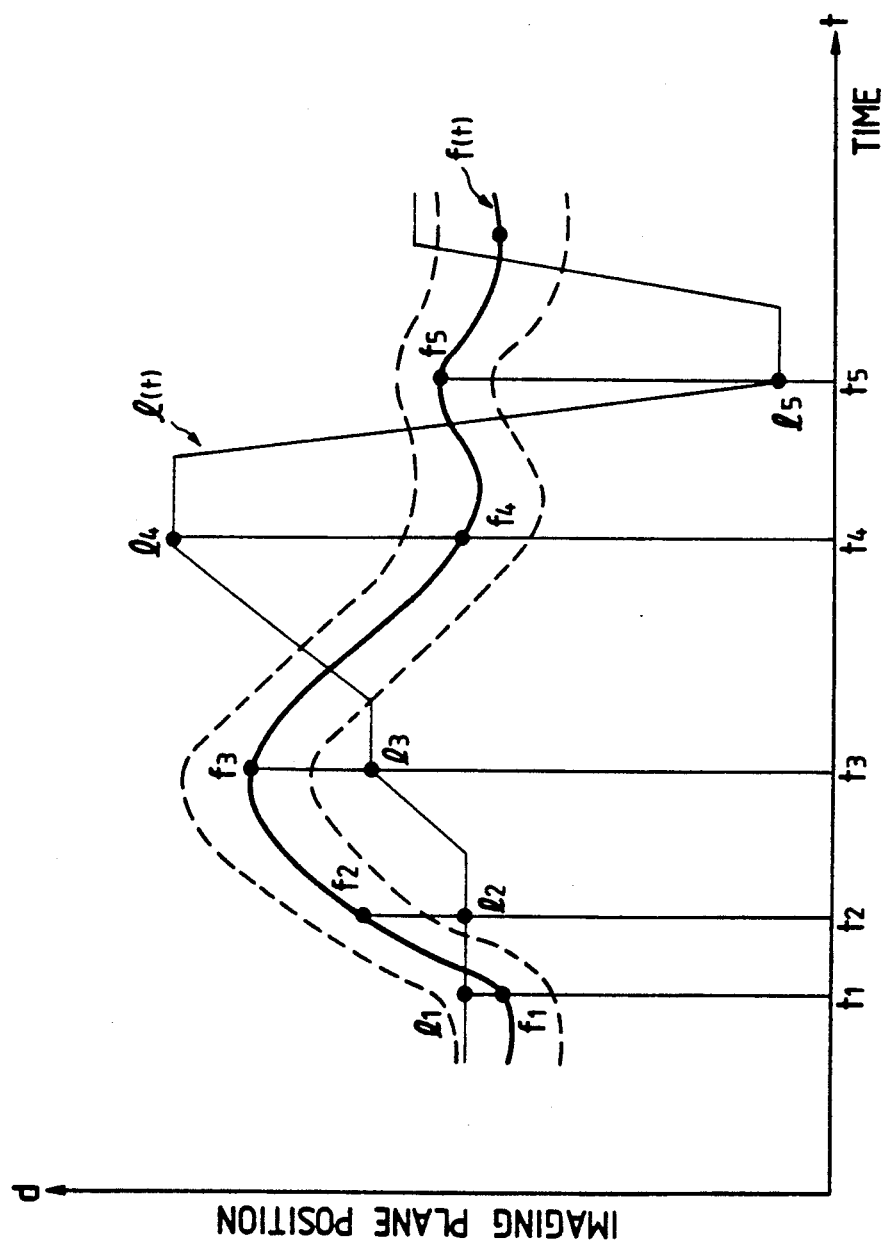
FIG. 10 is a chart schematically showing the focusing operation in such a conventional device of FIG. 9.

FIG. 8 shows the control of said embodiment of the present invention, based on the same results of focus state detection as in FIG. 10. As in FIG. 10, FIG. 8 shows the image plane position d of the object in the ordinate, as a function of time t in the abscissa. A solid line f(t) indicates the image plane position of the object, while a straight line l(t) indicates the image plane position of the lens, and broken lines indicate the depth of focus used in identifying the focused state.

The focus state detection at $(t_1, f_1)$ in FIG. 8 is conducted with a range of focused state the same as the depth of focus in FIG. 10 and the lens is not driven. Therefore, at the next focus state detection $(t_2, f_2)$, the range of focused state is enlarged, about 4 times in the illustrated case. Because of the thus enlarged range of focused state, the focus state detection at $(t_2, f_2)$ also identifies a focused state, so that the next focus state detection at $(t_3, f_3)$ is conducted without lens driving. In the conventional method, the corrective calculation is conducted on the past data including the result of said focus state detection, and a correction is added to the lens drive based on the result of the focus state detection at $(t_3, f_3)$. In the present embodiment, however, the correction is added after the focus state detection at $(t_3, f_3)$. Also, the range of focused state remains in the enlarged state because the result of a preceding focus state detection indicates the focused state, so that the focus state detection at $(t_3, F_3)$ also indicates a focused state and the lens is therefore not driven. Then, the next focus state detection at $(t_4, f_4)$ is conducted under the same conditions as at $(t_33)$ and identifies a focused state, so that the lens is not driven. Consequently, there is not conducted a lens drive involving unnecessary correction such as $l_4$ or $l_5$ in FIG. 10, and the lens maintains a constant position for a stopped object, thereby always enabling photographing in the focused state.

In summary, in the conventional lens driving method of adding a certain correction to the detected defocus amount for focusing to a moving object, in the course of accumulation of data necessary for calculation of said correction, namely in a state in which the correction is not applied by the correction means (focus state detecting period without the function of the correction means), the range of focused state is enlarged if a focused state is identified in the preceding focus state detection, and if the present and preceding focus state detections both identify a focused state while the correction is not applied, the correction is not applied even after the next focus state detection. This method eliminates unnecessary lens drive for a stopped object, thereby always enabling photographing in the focused state.

In the following there will be explained the structure of the device and the control sequence thereof for realizing the above-mentioned method, with reference to FIGS. 1 to 7.

Figure 1:
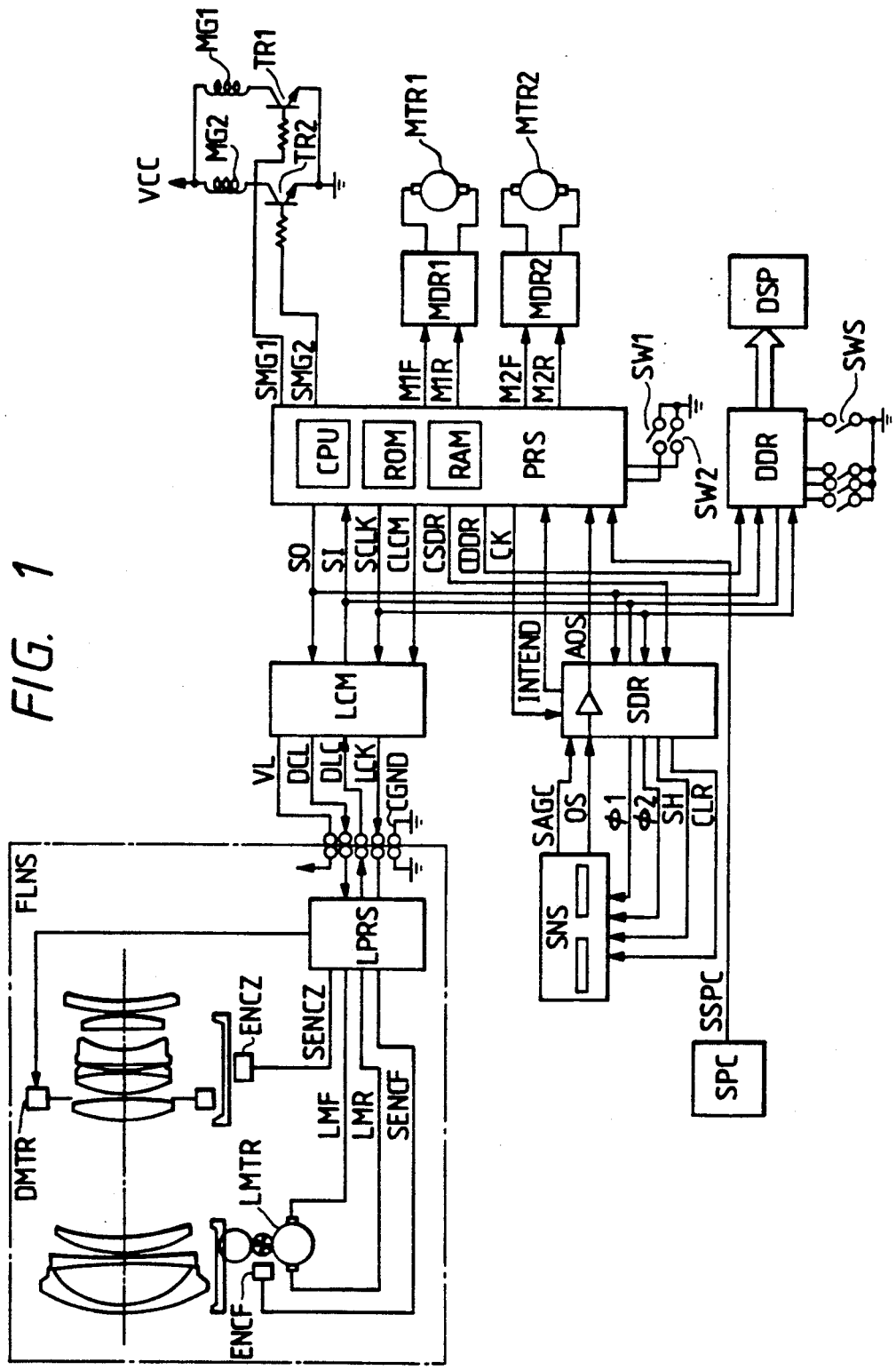
FIG. 1 is a block diagram of an embodiment of the present invention.

FIG. 1 is a circuit diagram of a camera equipped with a device embodying the present invention.

A process circuit PRS of the camera is composed of a one-chip microcomputer provided therein with a central processing unit (CPU), a ROM, a RAM and an A/D converter, and controls various functions of the camera such as automatic exposure control, automatic focusing, film winding and film rewinding according to sequence programs stored in the ROM. For this purpose the process circuit PRS controls the peripheral circuits of the camera and a control unit in the lens by communicating therewith by means of communication signals SO, SI, SCLK and communication selection signals CLCM, CSDR, CDDR.

The signal SO is the data signal released from the process circuit PRS, the signal SI is the data signal entered thereto, and the signal SCLK is the clock signal for the signals SO, SI.

A lens communication buffer circuit LCM supplies electric power to a lens power supply terminal VL while the camera is in function, and serves as a communication buffer between the camera and the lens when the selection signal CLCM from the process circuit PRS is at a high (H) level state.

When the process circuit PRS shifts said signal to the H-level and sends predetermined data as the signal SO in synchronization with the clock signal SCLK, the lens communication buffer circuit LCM sends the buffered signals LCK, SO through camera-lens communication contacts, respectively corresponding to said signals SCLK, SO. At the same time, it sends a buffered signal of the signal DCL from the lens as the data signal SI, which is received by the process circuit PRS in synchronization with the clock signal SCLK.

A sensor drive circuit SDR, for focus state detecting line sensors composed for example of CCD's, is selected when the signal CSDR is at the H-level and is controlled by the process circuit PRS through the signals SO, SI and SCLK mentioned above. A clock signal CK is used for generating CCD driving clock signals $\phi_1$, $\phi_2$, and a signal INTEND is used for informing the process circuit PRS of the completion of an accumulating operation.

An output signal OS of the line sensors SNS is a time-sequential image signal synchronized with the clock signals $\phi_1$, $\phi_2$, and, after amplification in an amplifier in the drive circuit SDR, is supplied as an image signal AOS to the process circuit PRS. The process circuit PRS receives said image signal AOS through an analog input port, converts it into a digital signal by the internal A/D converter in synchronization with the clock signal CK, and stores said digital signal in succession at predetermined addresses of the RAM.

Another output signal SAGC of the line sensors SNS, from an automatic gain control sensor therein, is supplied to the drive circuit SDR for accumulation time control of said sensors SNS.

A photosensor SPC for exposure control, receiving the light from the object signal SSPC which is supplied to an analog input port of the process circuit PRS is used, after A/D conversion, for automatic exposure control according to a predetermined program.

A switch detection/display circuit DDR is selected when the signal CDDR is at the H-level, and is controlled by the process circuit PRS through the signals SO, SI and SCLK. It serves to switch the display on a display unit DSP of the camera according to the data supplied from the process circuit PRS, and to inform the process circuit PRS of the on/off state of various operating members of the camera by communication procedures.

Switches SW1, SW2 are linked with an unrepresented shutter release button. The switch SW1 is closed by the depression of said button over a first stroke, and the switch SW2 is subsequently closed by the depression of said button over a second stroke. The process circuit PRS executes light metering and automatic focusing in response to the closing of the switch SW1, and exposure control and film winding in response to the closing of the switch SW2.

Said switch SW2 is connected to an interruption input port of a microcomputer constituting the process circuit PRS, whereby an interruption program is immediately started by the closing of the switch SW2, even if a program in response to the closing of the switch SW1 is under execution.

A film feeding motor MTR1 and a motor MTR2 for mirror movement and shutter charging are driven in forward or reverse direction respectively by drive circuits MDR1, MDR2, according to motor control signals M1F, M1R, M2F, M2R supplied from the process circuit PRS.

Magnets MG1, MG2 for respectively releasing the leading and trailing curtains of the shutter are respectively energized by signals SMG1, SMG2 supplied through amplifying transistors TR1, TR2, from the process circuit PRS.

The switch detection/display circuit DDR, motor drive circuits MDR1, MDR2 and the method of shutter control will not be explained further as they are not directly related to the present invention.

The signal DCL supplied to a lens process circuit LPRS in synchronization with the clock signal LCK represents command data sent from the camera to the lens FLNS, which executes predetermined operations in response to said commands. The lens process circuit LPRS analyzes said commands according to a predetermined procedure, thereby performing focusing and diaphragm control, and releases the functional states of the lens (state of focusing optical system and of diaphragm control) and various parameters (fully-open F-number, focal length, coefficient of movement of the focusing optical system to defocus amount etc.) as an output signal DLC.

In the present embodiment there is employed a zoom lens. In response to a focusing command from the camera, a focusing motor LMTR is driven by signals LMF, LMR according to the amount and direction of lens drive supplied simultaneously, thereby axially moving the optical system. The amount of movement is monitored by a pulse signal SENCF of an encoder circuit ENCF, countered by a counter in the lens process circuit LPRS, and, upon completion of predetermined movement, the lens process circuit LPRS shifts the signals LMF, LMR to the L-level, thereby braking the motor LMTR.

Therefore, once a focusing command is sent from the camera, the process circuit PRS need not be involved in the lens drive until its completion. Also, in the case of a request from the camera, the content of said counter can be transmitted to the camera.

When a diaphragm control command is sent from the camera, a stepping motor DMTR known for diaphragm control is driven according to the number of stops transmitted simultaneously. Since the stepping motor is capable of open control, there is not required an encoder for monitoring the operation thereof.

An encoder circuit ENC2 is attached to the zoom optical system, and the lens process circuit LPRS detects the zoom position by receiving a signal SENCZ from said encoder circuit ENCZ. The lens process circuit LPRS stores therein lens parameters corresponding to various zoom positions, and sends the parameters corresponding to the current zoom position to the camera, in response to a request therefrom.

In the following there will be explained the function of the above-mentioned camera, with reference to the flow charts shown in FIG. 2 and the ensuing drawings.

When an unrepresented power switch is turned on, the process circuit PRS is powered and starts the execution of a sequence program stored in the ROM.

Figure 2:
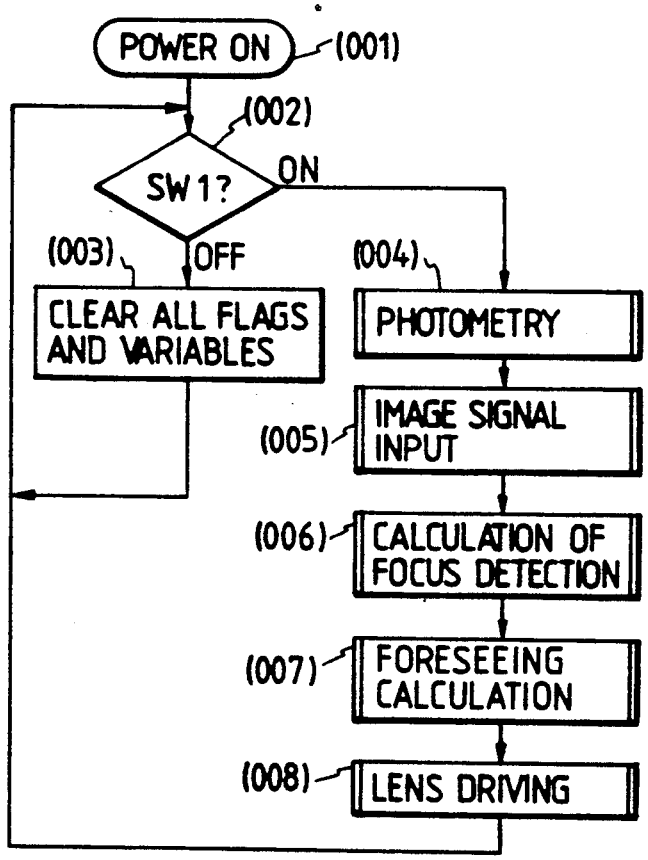
FIGS. 2 to 5 are flow charts of control sequences of an embodiment of the present invention.

FIG. 2 is a flow chart showing the entire flow of the above-mentioned program.

When the program execution is started in a step (001), a step (002) detects the state of the switch SW1 to be closed by the depression of the shutter release button over the first stroke. If the switch SW1 is off, the sequence proceeds to a step (003) for effecting the initialization by clearing all the flags and variables for control set in the RAM.

The above-mentioned steps (002) and (003) are repeated until the switch SW1 is turned on or the power switch is turned off. In response to the closing of the switch SW1, the sequence proceeds from the steps (002) to (004).

The step (004) executes a "photometry" subroutine for exposure control. The process circuit PRS receives the output signal SSPC of the photosensor SPC shown in FIG. 1 through the analog input port, effects the A/D conversion of said signal, calculates the optimum control values of shutter speed and diaphragm from said digital photometry value, and stores said control values in predetermined addresses of the RAM. At the shutter releasing operation, the shutter and the diaphragm are controlled based on these values.

Figure 3:
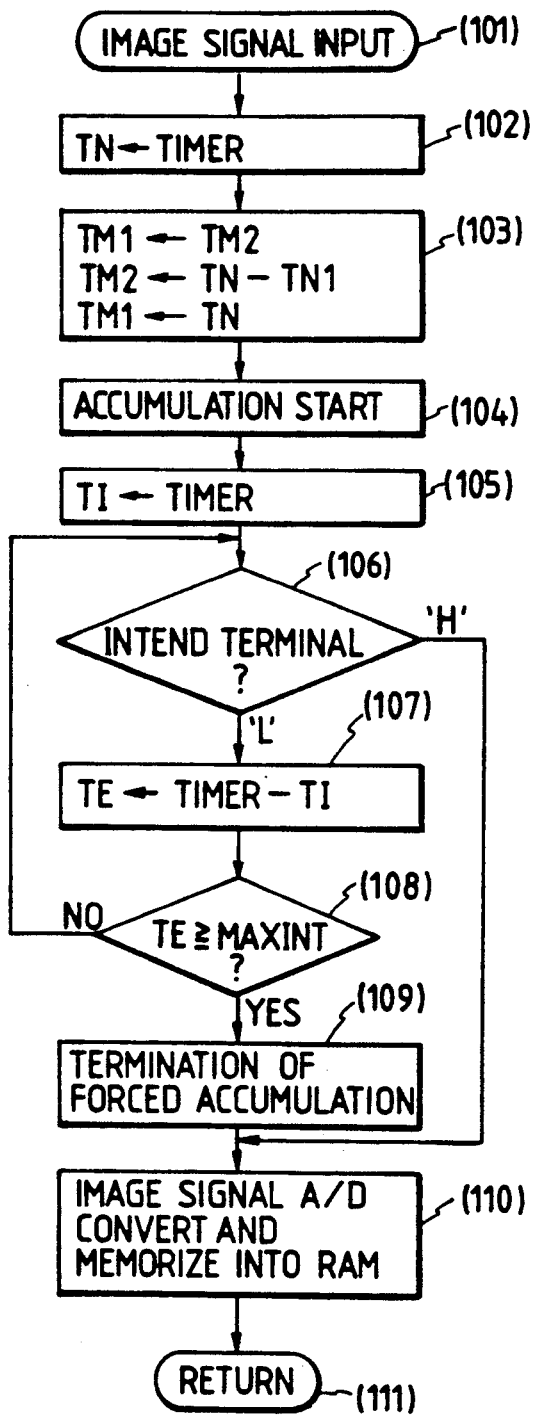

Then, a step (005) executes an "image signal input" subroutine, shown in FIG. 3, for entering an image signal from the focus state detecting line sensors SNS, as will be described later.

Then, a step (006) executes a "focus state detection" subroutine, for calculating the defocus amount DEF of the photographing lens according to the entered image signal. The specific method of calculation is disclosed for example in the Japanese Patent Application Sho 61-160824 and will not therefore be explained further.

Figure 5:
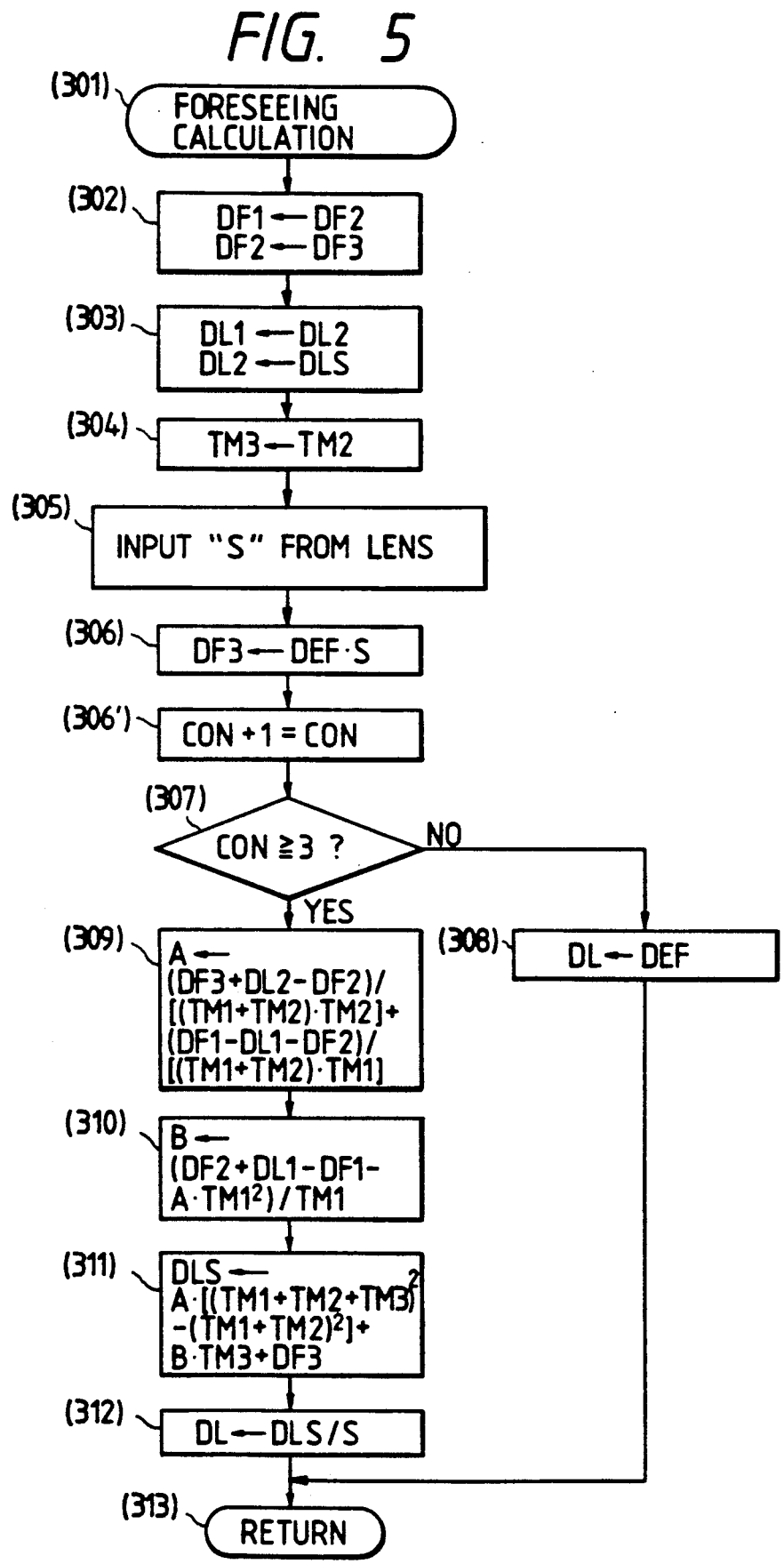

A next step (007) executes a "foreseeing calculation" subroutine, shown in FIG. 5, for correcting the lens drive amount according to the foregoing equations (9), (10) and (11).

Figure 7:
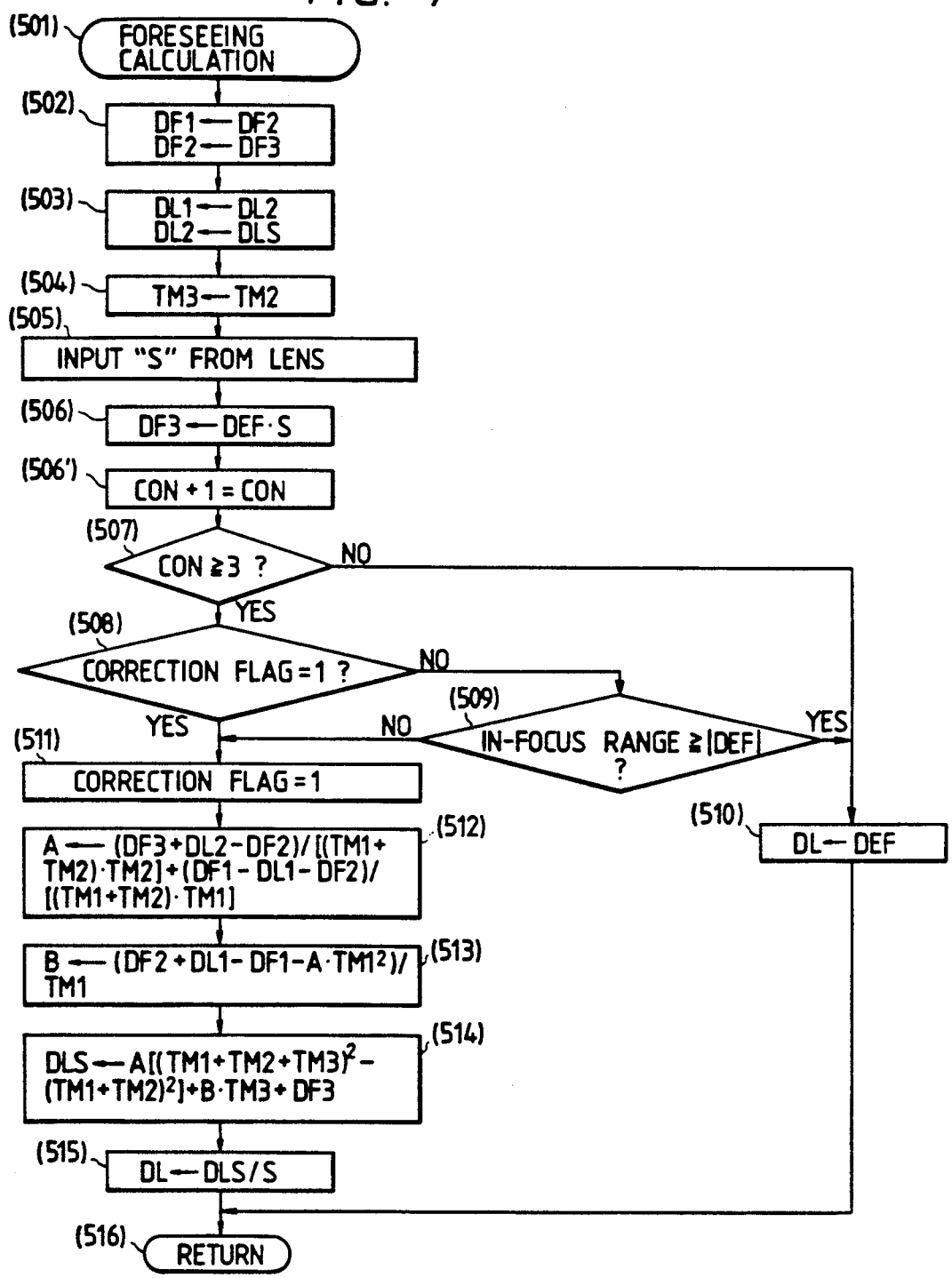

Then, a next step (008) executes a "lens drive" subroutine, shown in FIG. 7, for moving the lens according to the defocus amount DL corrected in the step (007).

After the completion of lens drive, the sequence returns to the step (002), and the steps (004) to (008) are repeatedly executed until the switch SW1 is turned off, thereby executing proper focusing even to a moving object.

The switch SW2, to be closed by the depression of the shutter release button over the second stroke, is connected to the interruption input port of the process circuit PRS, whereby, as explained before, the shutter releasing sequence is immediately started by interruption regardless of the step under execution when the switch SW2 is turned on, but the shutter releasing operation is not directly related to the present invention and will not, therefore, be explained further.

In the following there will be explained the "image signal input" subroutine shown in FIG. 3.

The "image signal input" is executed at the start of each focusing cycle. When said subroutine is called in a step (101), a step (102) stores the timer value TIMER of a self-running timer of the process circuit PRS in a memory area TN of the RAM, thereby recording the start time of the focusing operation.

A next step (103) renews the time intervals TM1, TM2 corresponding to TMi-2, TMi-1 in the foregoing equations (9), (10) and (11). Prior to the execution of the step (103), the areas TM1, TM2 store the time intervals TMi-2, TMi-1 used in the preceding focusing cycle, and the area TN1 stores the start time of the preceding focusing cycle.

Consequently, TM2 indicates the interval from the focusing cycle immediately before the last one to the last cycle, while TN-TN1 indicates the interval from the last focusing cycle to the current one, and these values are stored in the memory areas TM1, TM2 of the RAM, corresponding to TMi-2 and TMi-1 in the equations (9), (10) and (11). Also, the area TN1 stores the start time of the current cycle TN for the next focusing cycle.

Then a next step (104) causes the line sensors SNS to start the charge accumulation. More detailedly, the process circuit PRS sends an accumulation start command to the sensor drive circuit SDR, which in response shifts a clear signal CLR, for the photoelectric converting elements of the line sensors SNS, to the L-level, thereby starting the charge accumulation.

Then, a step (105) stores the current time, by storing the value of the self-running time in a variable area T1.

A next step (106) disciminates whether the accumulation is completed, by detecting the state of the input port INTEND of the process circuit PRS. Simultaneously with the start of accumulation, the sensor drive circuit SDR shifts the signal INTEND to the L-level, then monitors a signal SAGC from the line sensors SNS and, when said signal SAGC reaches a predetermined level, shifts the signal INTEND to the H-level and simultaneously a charge transfer signal SH to the H-level for a predetermined period, thereby transferring the charges of the photoelectric converting unit to the CCD unit.

The sequence proceeds from the step (106) to a step (110) if the INTEND port is at the H-level indicating the completion of accumulation, or to a step (107) if said port is at the L-level indicating that the accumulation is not yet complete.

The step (107) subtracts the time T1 stored in the step (105) from the value TIMER of the self-running timer, and stores the obtained difference as a variable TE. Consequently, the area TE stores the so-called accumulation time, namely the time from the start of accumulation to each respective time.

A next step (108) compares the variable TE with a constant NAXINT, and, if the former is smaller than the latter, the sequence returns to the step (106) to await the completion of charge accumulation. When the former becomes equal to or larger than the latter, the sequence proceeds to a step (109) to forcedly terminate the charge accumulation. Such a forced termination is conducted by sending an accumulation terminating command from the process circuit PRS to the drive circuit SDR.

In response to the accumulation terminating command from the process circuit PRS, the sensor drive circuit SDR shifts the charge transfer signal SH the H-level for a predetermined period, thereby transferring the charges accumulated in the photoelectric conversion unit to the CCD unit. The charge accumulation of the sensor is completed by the sequence up to the step (109).

A step (110) executes A/D conversion of the signal AOS, obtained by amplifying the image signal OS of the line sensors SNS by the sensor drive circuit SDR, and storage of a thus obtained digital signal into the RAM.

More detailedly, in synchronization with the clock signal CK from the process circuit PRS, the sensor drive circuit SDR provides a control circuit SSCNT of the line sensors SNS with CCD drive clock signals $\phi 1$, $\phi 2$, which drive the CCD unit of the sensors SNS to release the charges thereof as timesequential image signal OS. Said signal is amplified by an amplifier in the drive circuit SDR, and supplied, as the image signal AOS, to the analog input port of the process circuit PRS. The process circuit PRS effects A/D conversion in synchronization with the clock signal CK released by the process circuit PRS itself, and stores the digital image signal, obtained by said A/D conversion, in succession in predetermined addresses of the RAM.

After the image signal is entered in the aboveexplained fashion, the image signal input subroutine is terminated in a step (111).

Figure 4:
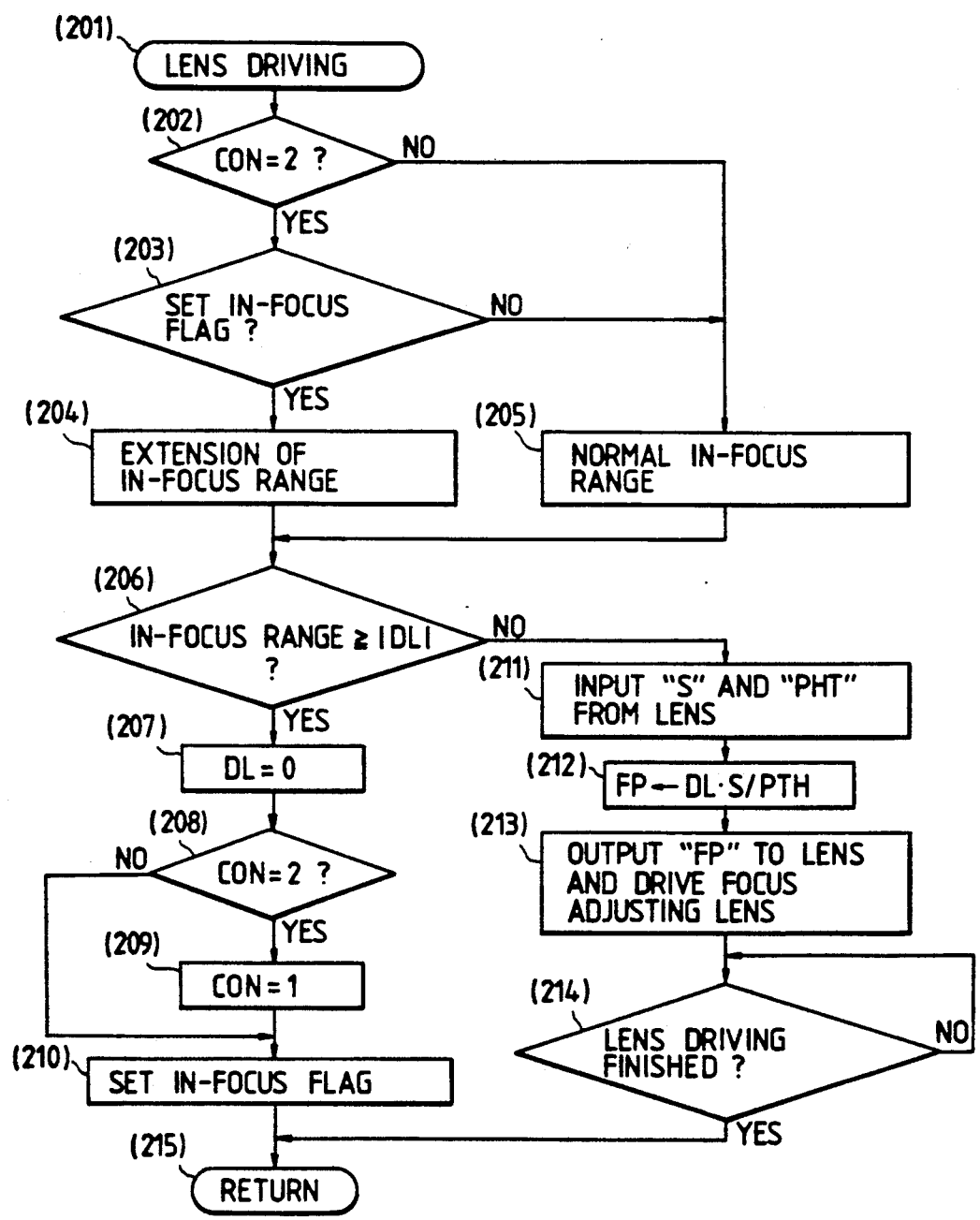

FIG. 4 is a flow chart of the "lens drive" subroutine.

When this subroutine is started, a step (202) discriminates whether a second distance measurement has been completed. According to the present invention, as explained before, the corrective calculation is conducted after three distance measurements, and the correction is made by said calculation on the defocus detected by the distance measurement. Consequently, said step is to confirm whether the current state is immediately before the addition of the corrective value. A counter CON is subjected to an increment at each distance measurement in a step (306') in FIG. 5, and the sequence proceeds to a step (203) only when CON=2. The step (203) discriminates whether the preceding, or first, distance measurement is identified as an in-focus state, by an in-focus flag to be set in a step (210) in the preceding distance measurement. If the in-focus state was identified in the preceding cycle, a step (204) enlarges the in-focus range. This operation corresponds to the foregoing expression that "the in-focus range is enlarged if the focused state is identified in the preceding cycle, in a period in which correction is not applied by the correction means".

If the step (202) identifies that the current state is not after a second distance measurement, namely either after the first one or after the third or ensuing one, a step (205) adopts the ordinary in-focus range, which in the examples shown in FIGS. 8 and 10 is selected as F $\delta/2$, wherein F is the fully-open F-number of the lens, and $\delta$ is the size of the minimum aberration circle. This is to effect the focusing with better precision after the first, third or ensuing cycle. The same applies even after the second distance measurement if the in-focus state was not identified in the preceding cycle. Only when the steps (202) and (203) identify that the second cycle has been completed and that the in-focus state was identified in the preceding cycle, the step (204) enlarges the in-focus range, for example to four times the usual range, or 2F $\delta$ in the case shown in FIG. 8.

A step (206) identifies the focus state, by comparing the absolute value |DL| of the defocus DL with the current in-focus range.

If the step (206) identifies an in-focus state, a step (207) sets the defocus DL equal to 0. A next step (208) discriminates whether the current lens drive is the second time, namely after the second distance measurement. If this is the second drive (CON=2), a step (209) sets the apparatus at a state after the first cycle (CON=1). Stated differently, the object is identified as being stopped, and the current distance measurement is regarded as the first one. In the ordinary situation, the next distance measurement is the third one, and the past data including the result thereof are used in a foreseeing calculation to correct the lens drive. In the present case, however, the object is identified as being stopped, so that the lens drive with correction is not started immediately after the next distance measurement but at least after two additional distance measurements. Thus, the result of the preceding, or first, distance measurement is discarded. Stated otherwise, for a stopped object, the state is controlled by the distance measurement of number so as not to start the foreseeing calculation until the object starts to move. This operation corresponds to the foreseeing expression that "if the preceding and current focus state detections both identify an in-focus state while the correction is not applied by the correction means, the correction is not applied after the next focus state detection".

A next step (210) identifies that the current distance measurement indicates the in-focus state, since the lens drive is not required. In this case the sequence proceeds to a step (215) to terminate the "lens drive" subroutine.

If the step (206) does not identify the in-focus state, a step (211) receives two data parameters "s" and "PTH" by communication with the lens. The data parameter "s", is the "coefficient of the amount of the movement of the image plane to the amount of movement of the focusing optical system", or the amount of movement of the image plane of the photographing lens, when it is axially moved by a unit distance. For an entirely movable single lens, s=1 because the entire photographing lens constitutes the focusing optical system, of which movement corresponds to the movement of the image plane. In the case of a zoom lens, the value "s" varies according to the position of the zooming optical system.

"PTH" is the amount of movement of the focusing optical system LNS per an output pulse of an encoder circuit ENCF linked with the axial movement of said optical system.

Consequently, so-called lens drive amount FP, namely the amount of movement of the focusing optical system converted into the number of output pulses of the encoder circuit, is given by the following equation, based on the defocus amount DL (to be determined in a step (308) or (312) in FIG. 5), and the above-mentioned parameters "s" and "PTH":

$$FP = DL \cdot s / PTH$$

A step (212) executes the calculation of this equation.

A step (213) instructs the lens to drive the focusing optical system, by sending the amount FP determined in the step (212) to said lens.

A next step (214) discriminates, through communication with the lens, whether the lens drive of the amount FP instructed in the step (212) has been completed, and, if completed, the sequence proceeds to a step (215) to terminate the "lens drive" subroutine.

FIG. 5 is a flow chart of the "foreseeing calculation" subroutine.

In the present embodiment, the calculations of the correcting equations (9), (10) and (11) are conducted by replacing the defocus amount therein with the amount of lens movement.

Said replacement is made by:

$$DF_i = DEF \cdot s \qquad (12)$$

wherein DEF is the latest detected defocus, and s is the lens coefficient explained above. After the replacement according to equation (12), progressive corrections are made according to the equations (9), (10) and (11) to obtain a corrected lens drive amount DLi.

Steps (302), (303) effect renewal of data for the present corrective calculation, because the equations (9), (10) and (11) are in progressive forms, employing the data of past plural cycles. The step (302) renews the data of the detected defocus amount converted into the lens drive amount, while the step (303) renews the corrected defocus amount converted into the lens drive amount.

A next step (304) stores the value of TM2 into TM3 corresponding to the time interval TMi from the present focusing cycle to the next one. As already explained in relation to the equation (11), the time interval TM3 from the present focusing cycle to the next one is assumed equal to the interval TM2 from the preceding cycle to the present one.

A step (305) receives the lens coefficient "s" from the lens, and a next step (306) converts the defocus, according to the equation (12), into the lens drive amount. Since the equations (9), (10) and (11) are in progressive form, the calculation of the equation (12) on the defocus detected in the present cycle allows conversion of all the defocus amounts into the lens drive amounts.

Then, a step (306') adds one to the content of the counter CON.

A next step (307) discriminates whether data for a foreseeing calculation are all ready, namely whether the correction is to be actually added or not. If the data of the past two focusing cycles and of the present focusing cycle are not yet available (CON<3), the sequence proceeds to a step (308) for taking the latest defocus amount DEF as the defocus amount DL for the lens drive, and then to a step (313) for terminating the "foreseeing calculation" subroutine.

If the data for the foreseeing calculation are ready (CON≧3), the sequence proceeds to steps (309), (310) and (311) respectively for effecting the calculations of the equations (9), (10) and (11), thereby obtaining a lens drive amount DLS converted from the defocus amount for lens drive.

Then, a step (312) calculates:

$$DL = DLS / s$$

thereby obtaining the defocus amount DL for use in the "lens drive" subroutine. Thereafter, a step (313) terminates the "foreseeing calculation" subroutine.

The control sequence in the flow of FIG. 4 can be summarized as follows.

At the first lens drive after the first distance measurement, since CON=1, there are executed the step (205) and then either the steps (211)–(214) or (207)–(210). At the lens drive after the second distance measurement, since CON=2, there are executed the step (203) and then either the step (204) or (205). If the second distance measurement indicates the in-focus state, the steps (207), (208), (209) and (210) are executed to shift the counter CON to "1". Thus, even after the third distance measurement, a state CON=2 is obtained instead of CON=3, whereby the lens drive is conducted in the same manner as after the second distance measurement. Consequently, as long as the second distance measurement continues to identify the in-focus state (as long as the cycle in the state CON=2 continues to identify the in-focus state), there is not executed the lens drive according to the foreseeing calculation (steps (309) to (312) in FIG. 5).

On the other hand, if the second distance measurement (in the state CON=2) does not identify the in-focus state, a state CON=3 is reached after the next distance measurement, whereby the steps (309)–(312) in FIG. 5 are executed to drive the lens according to the foreseeing calculation.

In the foregoing embodiment, the change in the image plane position resulting from the movement of the object is approximated by a second-order function, but the present invention is evidently also applicable to first-order functions or higher-order functions, or functions of other suitable forms.

Also, in the foregoing embodiment, if the second focus state detection (in a state CON=2) identifies an in-focus state while the correction is not applied by the correction means, the device is retained in a correction free state after the first detection cycle, but it is also possible to retain the device in a state after the second detection cycle. Stated differently, in the foregoing embodiment, the discrimination is made after the second distance measurement, and the correction applying state is entered when necessary data become available. On the other hand, in the latter case, the discrimination is made after three distance measurements, and the correction applying state is not necessarily entered even if the data are available.

In the following, this modified embodiment will be explained, with emphasis on the differences from the foregoing embodiment.

Figure 6:
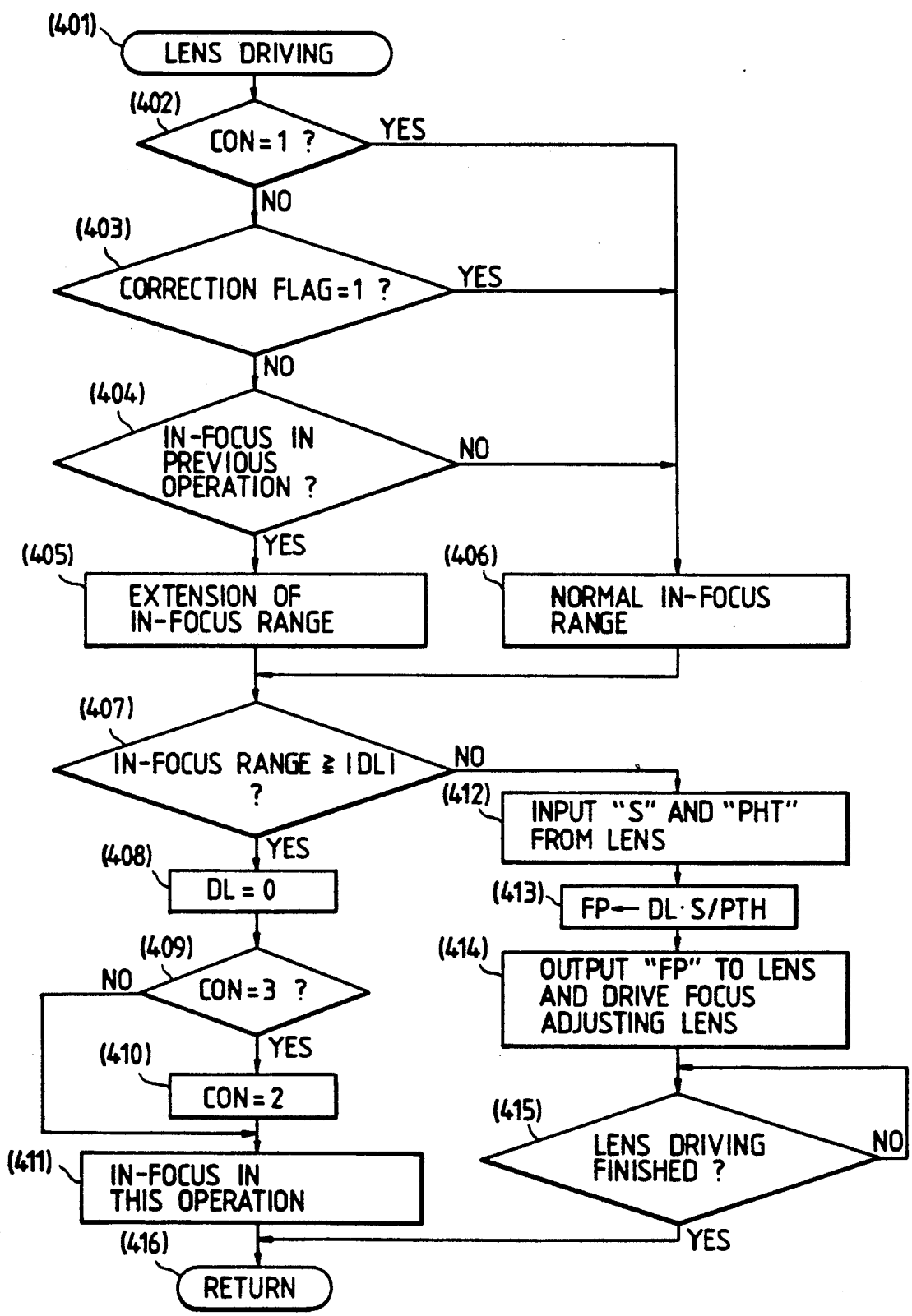
FIGS. 6 and 7 are flow charts of control sequences of principal portions in another embodiment of the present invention.

FIG. 6 is a flow chart of the "lens drive" subroutine, corresponding to FIG. 4.

In said subroutine, a step (402) discriminates whether the current state is after the first distance measurement. If not (CON≠1), the sequence proceeds to a step (403) for confirming whether the correction is to be added this time (by confirming the state of a correction flag to be described later in relation to FIG. 7). If the correction is not to be added this time, the sequence proceeds to a step (404) to discriminate whether the in-focus state was identified in the preceding cycle. If identified, a step (405) enlarges the in-focus range. On the other hand, if the step (402) identifies a state after the first distance measurement (CON=1), or if the step (403) identifies that the correction is to be added this time, or if the step (404) identifies that the in-focus state was not identified in the preceding cycle, the sequence proceeds to a step (406) for adopting the normal in-focus range.

Then, a step (407) executes the focus state detection with the in-focus range determined in the step (405) or (406).

If the step (407) identifies the in-focus state, the sequence proceeds to a step (408) to set the defocus amount DL as 0. Then, a step (409) discriminates whether the next lens drive is the third drive, namely after the third distance measurement (CON=3). If it is the third lens drive (CON=3), a step (410) sets the device at a state after the second lens drive (CON=2). Stated differently, the object is identified as being stopped, and the present distance measurement is regarded as the second one. In the ordinary situation, the present distance measurement is the third one, and the past data including the result of the third measurement are used in the foreseeing calculation to correct the lens drive. In the present case, however, the object is identified as being stopped, so that the lens drive with correction is not started immediately after the present distance measurement but at least after one additional distance measurement. A step (411) identifies that the in-focus state was identified in the present distance measurement since the lens drive was not needed. In this case the sequence proceeds to a step (416) to terminate the "lens drive" subroutine.

If the step (407) does not identify the in-focus state, the sequence proceeds to a step (412). The subsequent steps (412) to (415) are the same as those of steps (212) to (215) in the "lens drive" subroutine of the foregoing embodiment.

FIG. 7 is a flow chart of the "foreseeing calculation" subroutine corresponding to FIG. 5.

At the start of said subroutine, steps (502) to (507) are the same as those of steps (302)–(307) in the "foreseeing calculation" subroutine of the foregoing embodiment.

When the step (507) confirms that the data for foreseeing are available sufficient in quantity (CON>3), a step (508) discriminates whether the correction was actually applied in the preceding cycle, by confirming whether the correction flag, set in a step (511), is equal to "1". If the correction was not applied in the preceding cycle (correction flag=0), namely if the data have become available this time, a step (509) compares the absolute value |DEF| of the defocus DEF detected in the distance measurement with the in-focus range selected in this state. If the former is larger than the latter, there is discriminated the necessity of applying the correction, starting from the present cycle. The in-focus range is determined in the "lens drive" subroutine explained before. However, in the first cycle, the "foreseeing calculation" subroutine is executed at first without any change in the in-focus range, so that there is employed the normal in-focus range.

If the step (509) identifies that |DEF| is not larger than the in-focus range, or if the step (507) identifies that the data for foreseeing are not yet available, the correction is identified as being unnecessary for the present cycle. Therefore, the sequence proceeds to a step (510) for taking the latest defocus amount DEF as the amount of lens movement DL, and then to the step (516) for terminating the "foreseeing calculation" subroutine.

If the step (508) confirms the application of a correction in the preceding cycle (correction flag=1), or if the step (509) identifies that |DEF| is larger than the in-focus range, the application of correction is identified as being necessary for the present cycle. Thus, a step (511) sets the application of the correction (correction flag=1), and subsequent steps (512) to (516) are executed in the same manner as those steps (309) to (313) in the "foreseeing calculation" subroutine of the foregoing embodiment.

In this embodiment, if the preceding focus state detection identifies the in-focus state while the correction is not actually applied, the in-focus range to be used in the focus state detection of the present cycle is enlarged. Also, if the preceding and present focus state detections both identify the in-focus state while the correction is not actually applied, the state of the device is so controlled that the correction is not applied immediately after the next focus state detection. Such a control method avoids the lens driving operations involving unnecessary corrections even in the presence of certain fluctuations in the focus state detection for a stopped object, thereby maintaining a stable lens state and always enabling a photographing of the stopped object in a focus state.

What is claimed is:

1. An automatic focusing device having a correction calculating mode for calculating the lens drive amount for focusing to an object at a predetermined future time, base on the data of a plurality of past focusing cycles, or a camera provided with said automatic focusing device, comprising:
   (a) an enabling circuit for enabling said correction calculating mode after the execution of a plurality of focusing operations; and
   (b) a processing circuit for treating, when the lens is identified as being in-focus in a particular cycle of the plurality of focusing cycles, a next focusing operation as the particular focusing cycle.

2. A device or a camera according to claim 1, wherein said processing circuit continues to treat a next focusing operation as said particular focusing cycle when the lens is identified as being in-focus by the focusing operation which said processing circuit treats as said particular focusing cycle.

3. An automatic focusing device or a camera according to claim 1, wherein each of said focusing cycles includes a focus detection operation and a lens driving operation based on the result of the focus detection operation, and wherein the lens driving operation is omitted from the focusing cycle when the lens is determined to be in-focus by the focus detection result.

4. An automatic focusing device or a camera according to claim 1, further comprising focus state detecting means for widening the range of identifying said in-focus state in comparison with the range used before, in a focusing operation succeeding the focusing operation in which said in-focus state is identified.

5. An automatic focusing device or a camera according to claim 1, wherein said automatic focusing device determines a lens driving amount for each lens driving operation on the basis of data obtained in the latest predetermined number of focusing cycles in said correction calculating mode.

6. An automatic focusing device or a camera according to claim 1, wherein said automatic focusing device determines coefficients of a predetermined high-order function by using data in a plurality of past focusing cycles in the correction calculating mode and determines a lens driving amount on the basis of the thus determined high-order function.

7. An automatic focusing device or a camera according to claim 6, wherein the high-order function is a 2nd-order function.

8. An automatic focusing device or a camera according to claim 7, wherein the high order function is represented by $X = at^2 + bt + c$, wherein X is the position of an imaging plane at time t and coefficients a and b are determined on the basis of X being represented by data at the time of the focusing cycle and t being represented at the time of the focusing cycle.

9. An automatic focusing device having a correction calculating mode for calculating the lens drive amount for focusing to an object at a predetermined future time, based on the data of a plurality of past focusing cycles, or a camera provided with said automatic focusing device, comprising:
   (a) an enabling circuit for enabling, after execution of a plurality of (N) focusing operations, the calculation in said correction calculating mode utilizing the data of the 1st to N-th focusing operations; and
   (b) a process circuit which, if an in-focus state is identified in an M-th focusing operation among said N focusing operations, processes the next focusing operation again as the M-th operation, wherein M is a particular number such that $M \leq N$.

10. A device or a camera according to claim 9, further comprising focus state detecting means for widening the range of identifying said in-focus state in comparison with the range used before, in a focusing operation succeeding the focusing operation in which said in-focus state is identified.

11. An automatic focusing device or a camera according to claim 9, wherein said process circuit shifts a previous 1st through Mth operation by one operation and processes the shifted previous 1st through Mth operations as the new 1st through Mth operations when the next focusing operation is processed as the M-th focusing operation.

12. An automatic focusing device or a camera according to claim 9, wherein said automatic focusing device determines coefficients of a predetermined high-order function by using data in a plurality of past focusing cycles in the correction calculating mode and determines a lens driving amount on the basis of the thus determined high-order function.

13. An automatic focusing device or a camera according to claim 12, wherein the high-order function is a 2nd-order function.

14. An automatic focusing device or a camera according to claim 12, wherein the high order function is represented by $X = at^2 + bt + c$, wherein X is the position of an imaging plane at time t and coefficients a and b are determined on the basis of X being represented by data at the time of the focusing cycle and t being represented at the time of the focusing cycle.

15. An automatic focusing device having a correction calculating mode for calculating the lens drive amount for focusing to an object at a predetermined future time, based on the data of a plurality of past focusing cycles, or a camera provided with said automatic focusing device, comprising:
   (a) enabling means for enabling said correction calculating mode after the execution of a plurality of (N) focusing operations; and
   (b) a process circuit which, if an in-focus state is identified in an M-th focusing operation among said N focusing operations, processes the next focusing operation as the M-th focusing operation, wherein M is a particular number such that $M \leq N$.

16. A device or a camera according to claim 15, further comprising retaining means for retaining said process circuit in an activated state as long as the focusing operation processed as the M-th focusing operation by said process circuit indicates the in-focus state.

17. An automatic focusing device or a camera according to claim 15, further comprising focus state detecting means for widening the range of identifying said in-focus state in comparison with the range used before, in a focusing operation succeeding the focusing operation in which said in-focus state is identified.

18. An automatic focusing device or a camera according to claim 15, wherein said automatic focusing device determines coefficients of a predetermined high-order function by using data in a plurality of past focusing cycles in the correction calculating mode and determines a lens driving amount on the basis of the thus determined high-order function.

19. An automatic focusing device or a camera according to claim 18, wherein the high-order function is a 2nd-order function.

20. An automatic focusing device or a camera according to claim 18, wherein the high order function is represented by $X = at^2 + bt + c$, wherein X is the position of an imaging plane at time t and coefficients a and b are determined on the basis of X being represented by data at the time of the focusing cycle and t being represented at the time of the focusing cycle.

21. An automatic focusing device having a correction calculating mode for calculating the lens drive amount for focusing to an object at a predetermined future time, based on the data of a plurality of past focusing cycles, or a camera provided with said automatic focusing device, comprising:
   (a) a counter circuit for counting the number of focusing operations executed by the automatic focusing device;
   (b) a transfer control circuit for transferring to said correction calculating mode when the number counted by said counter circuit reaches a predetermined number; and
   (c) a cancellation circuit for cancelling, when the in-focus state is identified in a particular cycle of the plurality of focusing cycles, the counting operation of said counter circuit for the particular focusing cycle.

22. An automatic focusing device having a correction calculating mode for calculating the lens drive amount for focusing to an object at a predetermined future time, based on the data of a plurality of past focusing cycles, or a camera provided with said automatic focusing device, comprising:
   (a) enabling means for enabling said correction calculating mode after the execution of a plurality of focusing operations; and
   (b) a widening circuit for widening the range of identifying of the in-focus state when an in-focus state is identified in the course of execution of said plurality of focusing operations.

23. An automatic focusing device or a camera according to claim 22, wherein said widening circuit stops operation in said correction calculation mode.

24. An automatic focusing device having a correction calculating mode for calculating the lens drive amount for focusing to an object at a predetermined future time, based on the data of a plurality of past focusing cycles, or a camera provided with said automatic focusing device, comprising:
   (a) enabling means for enabling said correction calculating mode after the execution of a plurality of focusing operations; and
   (b) a widening circuit for widening the range of identifying of the in-focus state, such that said widening circuit starts to operate when the in-focus state is identified in a particular cycle during said plurality of focusing cycles.

25. An automatic focusing device or a camera according to claim 24, wherein said widening circuit stops operation in said correction calculation mode.

* * * * *

UNITED STATES PATENT AND TRADEMARK OFFICE
CERTIFICATE OF CORRECTION

PATENT NO. : 5,081,479

DATED : January 14, 1992

INVENTOR(S) : Terutake KADOHARA, et al.

It is certified that error appears in the above-identified patent and that said Letters Patent is hereby corrected as shown below:

COLUMN 1:
  Line 58, "the" (1st and 2nd occurrences) should read --an--; and
  Line 65, "to" should be deleted.

COLUMN 2:
  Line 23, "represented" should read --are represented--; and
  Line 42, "point;" should read --point:--.

COLUMN 5:
  Line 25, "$f_3$)," should read --$f_3$).--;
  Line 28, "($t_3, F_3$)" should --$(t_3, f_3)$--; and
  Line 31, "($t_33$)" should read --$(t_3, f_3)$--.

COLUMN 8:
  Line 16, "steps" should read --step--.

COLUMN 9:
  Line 15, "Then" should read --Then,--; and
  Line 59, "SH" should read --SH to--.

UNITED STATES PATENT AND TRADEMARK OFFICE
CERTIFICATE OF CORRECTION

PATENT NO. : 5,081,479

DATED : January 14, 1992

INVENTOR(S) : Terutake KADOHARA, et al.

It is certified that error appears in the above-identified patent and that said Letters Patent is hereby corrected as shown below:

COLUMN 10:
    Line 6, "timesequential" should read --time sequential--; and
    Line 15, "aboveex-" should read --above ex- --.

COLUMN 11:
    Line 9, "distance measurement of num-" should read --number of the distance measurement--;
    Line 10, "ber" should be deleted; and
    Line 23, ""s"," should read --"s"--.

COLUMN 14:
    Line 18, "sufficient in" should read --in sufficient--;
    Line 66, "a" should read --the--; and
    Line 66, "the" should read --a--.

COLUMN 15:
    Line 4, "base" should read --based--.

Signed and Sealed this

Fifteenth Day of June, 1993

Attest:

MICHAEL K. KIRK

Attesting Officer      Acting Commissioner of Patents and Trademarks